3,536,889
ELECTRICAL SWITCH ACTUATING
MECHANISM
Gerhard Harz, Regensburg, Germany, assignor to Sachsenwerk Licht- und Kraft-Aktiengesellschaft, Munich, Germany
Filed June 26, 1967, Ser. No. 648,890
Claims priority, application Germany, July 22, 1966, S 104,958
Int. Cl. H01h 33/68
U.S. Cl. 200—150                                                         11 Claims

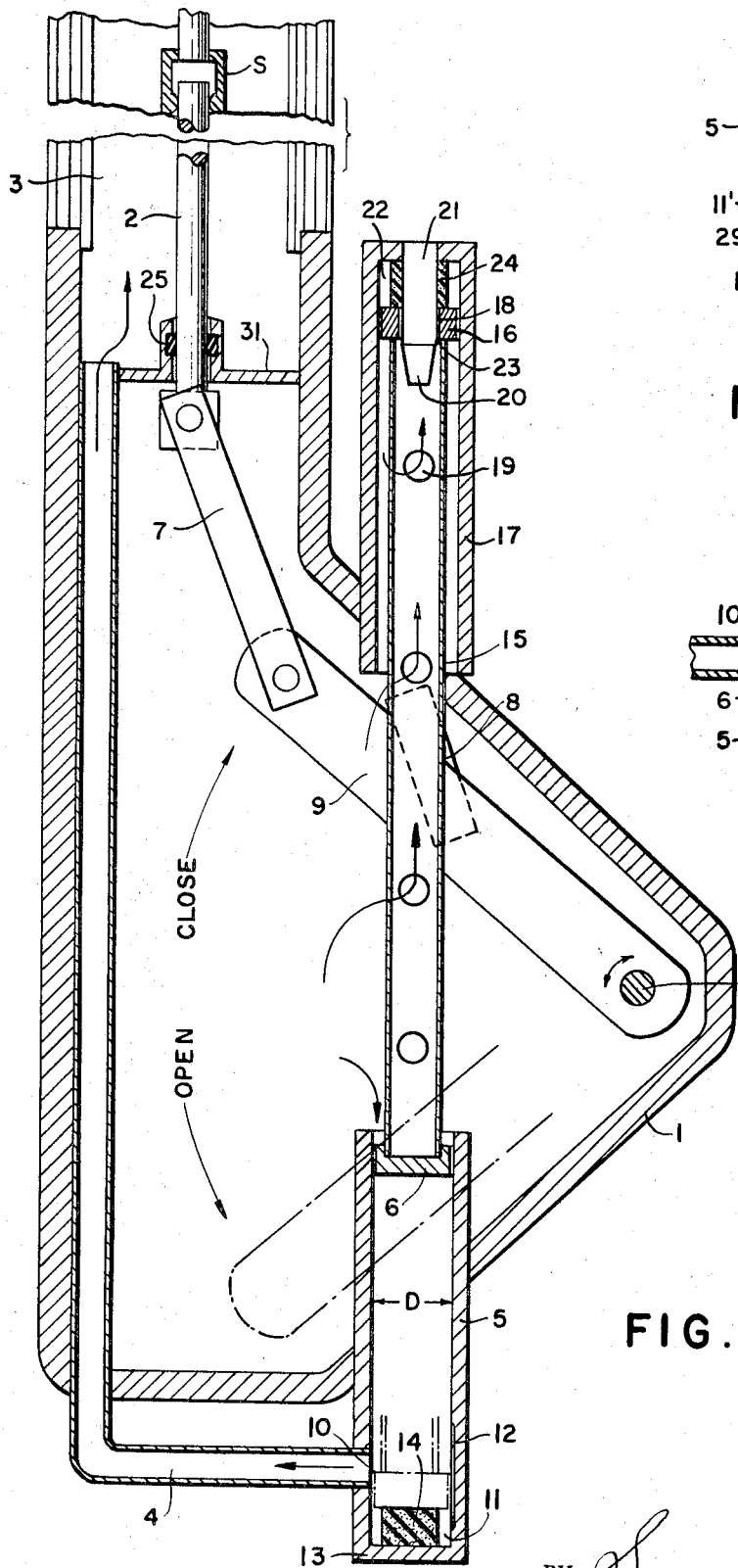
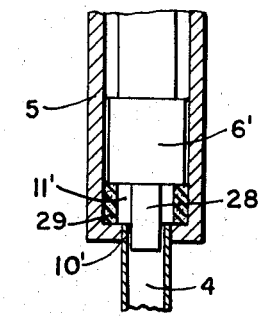
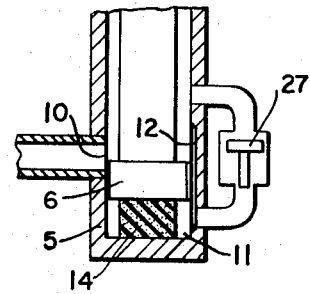

ABSTRACT OF THE DISCLOSURE

An electrical switch including an arc-extinguishing fluid switching chamber enclosing a pair of switch contacts, a movable switching member for moving the contacts between an open and a closed position, and a first piston-cylinder unit coupled to the movable switching member for pumping fluid into the fluid switching chamber as the movable switching member moves toward its open-contact position to compensate for changes of volume in the switching chamber. A damping chamber is provided in the cylinder of the first piston-cylinder unit for damping the movement of the piston as the movable switching member approaches its open-contact position, and a second piston-cylinder unit is coupled to the movable switching member for damping the movement of the movable switching member as it approaches its closed-contact position.

BACKGROUND OF THE INVENTION

This invention relates to electrical power switches which include an arc-extinguishing fluid switching chamber enclosing the contacts thereof, a movable switching member which moves out of the fluid switching chamber when the switch contacts are opened, and a piston-cylinder unit coupled to the movable switching member for pumping fluid into the fluid switching chamber as the movable switching member moves out of the chamber to compensate for changes of volume in the switching chamber. In this general type of switch, the movable switching member usually moves into a drive housing which is adjacent to but sealed off from the fluid switching chamber, and the piston of the piston-cylinder unit is usually driven by the drive elements which are coupled to the movable switching member within the drive housing. The cylinder of the piston-cylinder unit is hydraulically coupled to the fluid switching chamber, and the volume of fluid pumped into the fluid switching chamber at any instant is equal to the volume of the movable switching member which has moved out of the fluid switching chamber, thereby exactly compensating for the movement of the movable switching member.

By means of the above-noted piston-cylinder unit, the current-dependent pressures effective upon the movable switching member during the switching-off operation can be equalized in such a manner that the drive housing remains free of the high pressures occurring in the switching chamber. The piston-cylinder unit, however, necessitates an increase in the movable mass, the effect of which upon the switch drive cannot always be neglected. Normally, with a pressure-balanced switching member, approximately the same switching member acceleration and velocity is required as in a comparable switching device without a pressure balancing piston-cylinder unit. However, as a consequence of the piston-cylinder unit, a higher driving power is required. Because of the higher driving power, the inertial forces generated when the movable masses are decelerated, increase to a corresponding degree if the deceleration time and distance remains the same. Since the forces produced during the deceleration are in most cases considerably stronger than the acceleration forces, it is necessary to dimension the drive elements in correspondence with the deceleration forces if the braking procedure takes place in a conventional manner by means of stops at the switching shaft actuated by a spring force storage means.

SUMMARY OF THE INVENTION

The object of the present invention is to provide improved braking means for a pressure-balanced switching member so that the deceleration forces thereof do not effect the switch drive means. In accordance with the invention, this object is achieved by providing a damping chamber in the cylinder of the piston-cylinder unit so that when the piston enters the damping chamber, fluid is trapped therein and exits around the piston through exit channels whose resistance preferably varies in accordance with the position of the piston. The movement of the switching member in the opposite direction is damped by connecting the piston of the first piston-cylinder unit to the piston of a second piston-cylinder unit which also contains a damping chamber for damping the movement of the piston in the opposite direction. It is advantageous to fill the damping chambers of the two cylinders partially with an elastically deformable terminal stop made, for example, of rubber.

The damping chamber for the switching-off damping process is formed by extending a portion of the corresponding cylinder past the laterally arranged outlet port for the conduit leading to the arc-extinguishing switching chamber, the damping chamber being in communication with the space above the outlet port via channels of a small cross section in the cylinder wall. It is also possible to use a check relief valve in a connecting conduit between the damping chamber and the space above the outlet port. The piston can also carry a stud-shaped lug which is received, at the end of the switching-off movement, in a tubular outlet opening.

The second piston, which serves to damp the switching-on movement, is connected with the first piston by a tubular rod. The second piston is annular and is pushed over a pin with a conical tip at the end of the switching-on movement. The pin is mounted within the end of the corresponding cylinder. Thus, an annular slot is created having an inner diameter which increases toward the end of the switching-on movement, the liquid being pressed through this slot by the piston.

BRIEF DESCRIPTION OF THE DRAWINGS

FIG. 1 is a vertical cross-sectional view of one illustrative switch actuating mechanism of this invention.

FIG. 2 is a vertical cross-sectional view of a modified damping chamber for the embodiment shown in FIG. 1.

FIG. 3 is a vertical cross-sectional view of another modified damping chamber for the embodiment shown in FIG. 1.

DESCRIPTION OF THE PREFERRED EMBODIMENTS

FIGS. 1 to 3 show three illustrative embodiments of the invention. In FIG. 1, the lower section of a switching pole for a multi-pole, low-fluid power switch is illustrated, the drive housing 1 of which is full of fluid and is maintained pressureless with the aid of a first piston-cylinder unit 5, 6. The switch is actuated by a known device (not shown) which turns shaft 30 to move crank 9. Chamber 3 has a bottom wall 31 which defines an opening for pin 2 to pass through into drive housing 1, so as to be connected to coupling member 7. A suitable sealing element 25 assures a fluid-tight seal between chamber 3 and housing 1. Pin 2 slides in the seal 25. If, upon switching the device off, the switching pin 2, illustrated in the "on" position with respect to a stationary contact S, is pulled downwardly, the evaporation of the arc-extinguishing fluid in chamber 3, which is also full of fluid, by the arc will produce a pressure approximately proportional to the switching-off current, which pressure produces a force upon the switching pin directed in the disconnecting direction. The pressure present in the arc-extinguishing fluid switching chamber 3 can, however, also travel via a tubular conduit 4 to the cylinder 5, whereby the piston 6 is pressed upwardly with a force corresponding to the surface area of the piston. The two forces are effective upon the crank 9 via the coupling members 7 and 8 in opposite directions, in such a manner that the effects of these forces are balanced in any position of the crank 9. Piston 6, pin 2 and linkages 7–9 are so dimensioned that the piston 6 pumps an amount of fluid into chamber 3 to compensate for the loss of volume to chamber 3 by the withdrawal of pin 2. This results in both chambers 1 and 3 being filled with fluid at all times. For braking the moved masses at the end of the disconnection movement, the pump cylinder 5 is extended past the outlet opening 10 so that the piston 6 moving downwardly enters an almost completely closed damping chamber 11 as soon as it passes the outlet opening 10. During further movement of the piston 6, the extinguishing fluid compressed in the damping chamber 11 flows through the relatively small cross section of channels 12 in the wall of cylinder 5 to the rear of the piston 6. Since it is possible to control the effective cross section of the channels 12 by the downwardly moved piston 6, in dependence upon the position thereof, for example, by differing depths and breadths of the channels 12, it is possible to gently brake the move masses with an approximately constant deceleration. For limiting the piston movement, a disk 14 of an elastically deformable material such as rubber is provided which is affixed to the bottom 13 of the cylinder 5, and which can, if necessary, also absorb a portion of the kinetic energy. The various elements, that is cylinder 5, rod 15 and linkages 7–9, are designed such that the pressure in chamber 3, and hence, conduit 4, have subsided to an acceptable level for chamber 1 by the time piston 6 passes opening 10 and connects the chamber 1 with chamber 3. The deceleration of the moved masses at the end of the switching-on movement likewise takes place with the use of hydraulic means, namely with the aid of an annular piston 16 fastened to the tubular piston rod 15, this second piston sliding in a second cylinder 17 located oppositely the first cylinder 6. During the switching-on movement, the extinguishing fluid contained in the top-sealed cylinder 17 can, at first, flow freely through the inner opening 18 in the piston 16 and through the openings 19 in the tubular piston rod 15. When the piston 16 has reached the conical tip 20 of the pin 21, however a damping chamber 22 is created from which the extinguishing fluid can exit only through the annular slot 23 between the piston 16 and the pin 21. Since the cross section of this annular slot is dependent upon the position of the piston 16, the switching-on movement can likewise be decelerated with an approximately constant deceleration. As a terminal stop, an elastic ring 24 is provided, made, for example, of oil-resistant rubber, which can absorb a portion of the kinetic energy just like the rubber disk 14.

By the wide spacing of the two pistons 6 and 16 from each other, a particularly frictionless guidance is ensured, and thus there is little wear and tear in spite of the simplicity of the device.

Of course, it is also possible to construct the drive housing 1 for example as a cast part in such a manner that the conduit 4, the first cylinder 5, and the second cylinder 17 are entirely within the drive housing 1 and form an integral part therewith.

FIG. 2 shows the lower section of a modified cylinder 5 the damping chamber 11 of which is in communication, by way of a check valve 27, with the space above the outlet opening 10. By this construction, upon switching the device on, the suction effect of the piston 6 during its upward movement is eliminated, without altering the effect of the channels 12 upon switching the device off. The additional expenditure for the check valve is justified in applications where a particularly short switching-on time is required.

In FIG. 3, another modification of the cylinder 5 is illustrated having an axially provided outlet opening 10'. The damping chamber 11' in this modification is closed off by a pin-shaped projection 28 of the piston 6' when the latter plunges into the outlet opening 10'. In this embodiment, an elastically deformable ring 29 serves as the stop member, which ring contacts the wall of cylinder 5. The use of a check valve 27 is also possible in this embodiment, of course, and the check valve could even be provided in the interior of the piston 6'. Another possibility is to provide the lug 28 with corresponding channels, or with a conical tip, so that the extinguishing fluid displaced in the damping chamber 11' can exit only through the conduit 4. In this manner, a mixing of the extinguishing fluid in chamber 3 and drive housing 1 is avoided.

The principal advantage of the invention is that the drive elements which act on the crank remain free of the forces produced when braking the switching pin and the pistons attached thereto. The braking step can be carried out independently of the size of the disconnection current in an optimum manner, i.e., with constant deceleration. In addition, the hydraulic braking is suitable for a long period of utilization because of its low wear and tear.

It will be understood that the above description of the present invention is susceptible to various modifications, changes, and adaptations, and the same are intended to be comprehended within the meaning and range of equivalents of the appended claims.

What is claimed is:

1. In an electrical switch containing first and second switch contacts, an improved switch actuating mechanism for opening and closing said contacts, comprising, in combination:
   (a) a movable switching member which includes said first contact and which is movable between an open and a closed position with respect to said second contact;
   (b) an arc-extinguishing fluid chamber filled with arc-extinguishing fluid and enclosing said second contact and at least a portion of said movable switching member, said movable switching member being slidable through an opening defined in said arc-extinguishing fluid chamber, and fluid sealing means sealing the space between the wall of said opening and said movable switching member;
   (c) a housing filled with fluid and enclosing at least a portion of said movable switching member;
   (d) drive means arranged in said housing and coupled to said movable switching member in the portion thereof in said housing for moving the movable switching member between its open and closed positions;
   (e) a first piston-cylinder unit connected with said housing for fluid flow therebetween and coupled to said drive means for pumping fluid into said arc-extinguishing fluid chamber as said movable switching member is moved toward its open position, the cylinder of said piston-cylinder unit being connected to said arc-extinguishing fluid chamber for fluid flow therebetween, and the piston of said piston-cylinder unit being mechanically coupled to said drive means, said piston and cylinder preventing fluid flow between said arc-extinguishing fluid chamber and said housing at least until the pressure exerted on said housing by the arc-extinguishing fluid is below a predetermined value; and
   (f) a damping chamber within said cylinder at one end thereof for damping the movement of said piston as the piston approaches said one end of the cylinder, thereby damping the movement of said drive means and said movable switching member as the switching member approaches its open position.

2. A switch actuating mechanism as defined in claim 1, and further comprising a second piston-cylinder unit coupled to said drive means for damping the movement of said drive means and said movable switching member as the switching member approaches its closed position.

3. A switch actuating mechanism as defined in claim 2, and further comprising an elastically deformable terminal stop member in each of said cylinders for terminating the movement of the corresponding piston.

4. A switch actuating mechanism as defined in claim 1, wherein said cylinder includes an outlet port for coupling the cylinder to said arc-extinguishing fluid chamber, said damping chamber comprising an end portion of said cylinder which extends past said outlet port, and further comprising channels in the cylinder wall of said damping chamber for communicating between the damping chamber and the other portions of the cylinder.

5. A switch actuating mechanism as defined in claim 4, and further comprising a conduit coupled between said damping chamber and the other portions of the cylinder and a check valve in said conduit.

6. A switch actuating mechanism as defined in claim 1, wherein said cylinder includes an outlet port on one end thereof for coupling said cylinder to said arc-extinguishing fluid chamber, and wherein said piston includes a projecting lug for entering and closing said outlet port near the end of the piston's axial movement within the cylinder.

7. A switch actuating mechanism as defined in claim 2, wherein the pistons of said first and second piston-cylinder units are connected together by a tubular rod, the piston of said second piston-cylinder unit being an annular piston, and further comprising a pin in one end of the cylinder of said second piston-cylinder unit for engaging and closing the central opening of said annular piston near the end of its axial travel to damp the movement of said drive means and said movable switching member as the switching member approaches its closed position.

8. A mechanism as defined in claim 7, and further comprising an elastically deformable terminal stop member in each of said cylinders for terminating the movement of the corresponding piston.

9. A switch actuating mechanism as defined in claim 3 wherein said cylinder of said first piston-cylinder unit includes an outlet port for coupling said cylinder to said arc-extinguishing fluid chamber, and said damping chamber includes an end portion of said cylinder which extends past said outlet port, and the pistons of said first and second piston-cylinder units are connected together by a tubular rod, the piston of said second piston-cylinder unit is an annular piston, and further comprising: a tubular rod connecting together said pistons of said first and second piston-cylinder units; and a pin in one end of the cylinder of said second piston-cylinder unit for engaging and closing the central opening of said annular piston near the end of its axial travel to damp the movement of said drive means and said movable switching member as the switching member approaches its closed position; the cylinder wall of said damping chamber being provided with channels for communicating between said damping chamber and the other portions of the cylinder of said first piston-cylinder unit.

10. A switch actuating mechanism as defined in claim 9, further comprising a conduit coupled between said damping chamber and the other portions of said cylinder of said first piston-cylinder unit, and a check valve in said conduit.

11. A switch actuating mechanism as defined in claim 9 wherein said outlet port for coupling said cylinder of said first piston-cylinder unit to said arc-extinguishing fluid chamber is arranged on one end of said cylinder, and wherein said piston of said first piston-cylinder unit includes a projecting lug for entering and closing said outlet port near the end of the axial movement of said piston within said cylinder.

References Cited

UNITED STATES PATENTS

| 1,904,539 | 4/1933 | Ruppel. | |
| 2,775,670 | 12/1956 | Geiger. | |
| 3,374,320 | 3/1968 | Buhler | 200—34 X |

FOREIGN PATENTS

| 568,091 | 1/1933 | Germany. |
| 1,085,592 | 7/1960 | Germany. |
| 778,909 | 7/1957 | Great Britain. |
| 882,818 | 11/1961 | Great Britain. |
| 1,028,953 | 5/1966 | Great Britain. |

ROBERT S. MACON, Primary Examiner

U.S. Cl. X.R.

200—34, 166